United States Patent

[11] 3,618,649

| [72] | Inventor | Edward L. Benno<br>Route 1, Box 198, Grayslake, Ill. 60030 |
|---|---|---|
| [21] | Appl. No. | 14,534 |
| [22] | Filed | Feb. 26, 1970 |
| [45] | Patented | Nov. 9, 1971 |

[54] HAY BALE CUTTER
4 Claims, 2 Drawing Figs.

| [52] | U.S. Cl. | 146/70.1 |
|---|---|---|
| [51] | Int. Cl. | A01f 29/00 |
| [50] | Field of Search | 146/70.1, 123; 83/201.8, 201.13; 143/22, 32 Q |

[56] References Cited
UNITED STATES PATENTS

| 926,241 | 6/1909 | Chesebro | 146/123 |
|---|---|---|---|
| 2,997,088 | 8/1961 | Nickle et al. | 146/123 |
| 3,344,830 | 10/1967 | Longman | 83/201.13 X |

*Primary Examiner*—Willie G. Abercrombie

ABSTRACT: A hay bale slicing machine comprising spaced, endless cutters mounted so as to extend into a hopper in cantilevered fashion, an anticlogging deflector disposed between said cutters and at one end thereof.

PATENTED NOV 9 1971
3,618,649
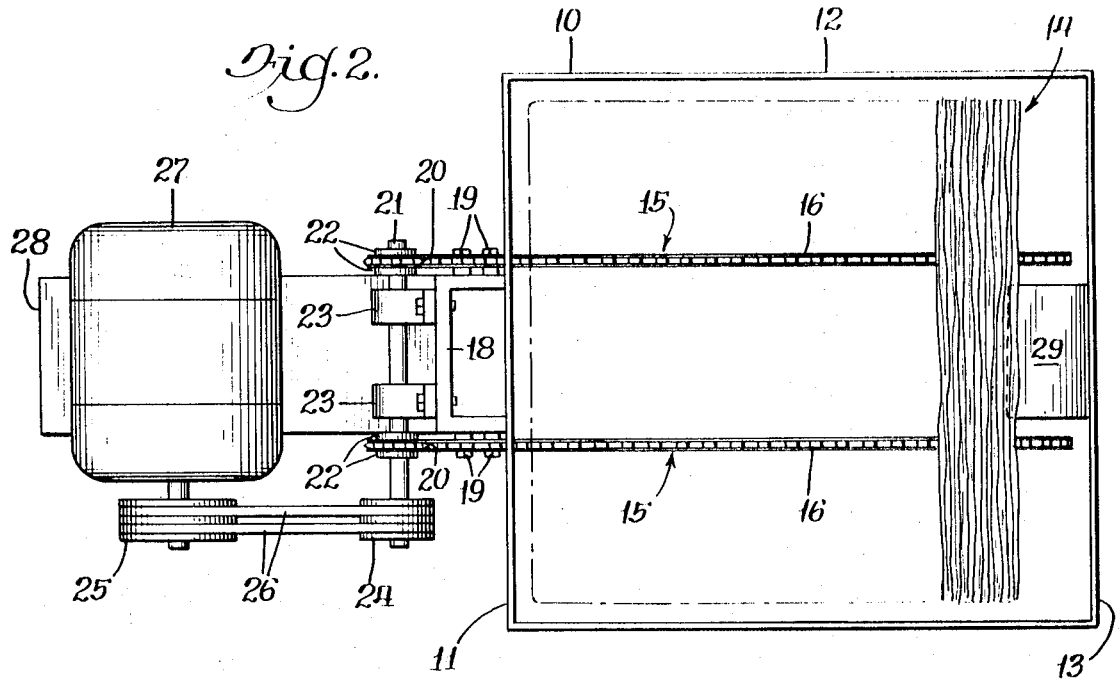
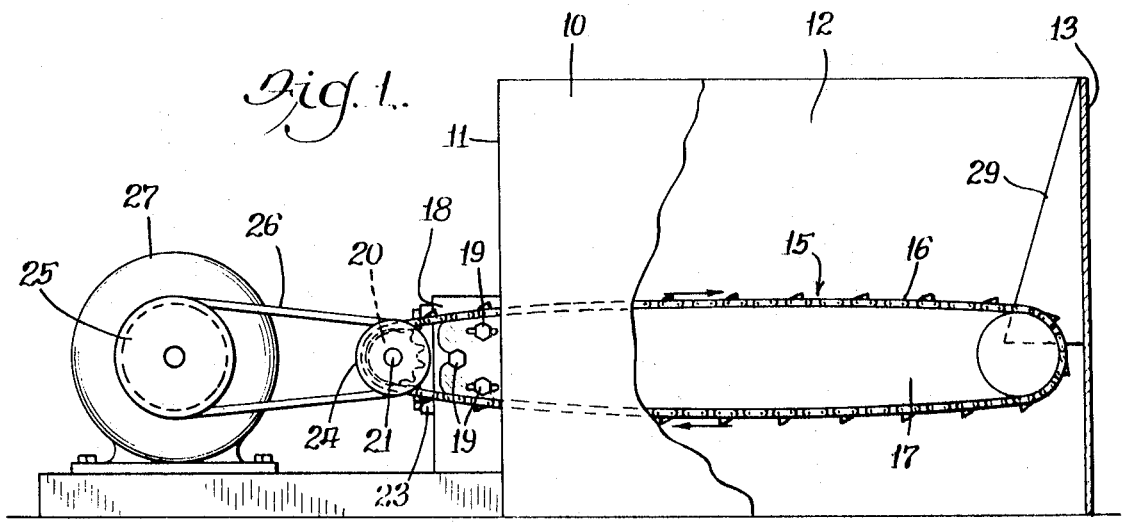
Inventor:
Edward L. Benns 3,618,649

HAY BALE CUTTER

SUMMARY

This invention concerns a machine for cutting bales of hay or straw into relatively small masses or fragments. The invention is an improvement in a cutter such as shown and described in my pending application filed Nov. 26, 1969, Ser. No. 880,204, and particularly involves an improved arrangement for avoiding clogging of the cutting mechanism.

DESCRIPTION

FIG. 1 is an end elevational view of one embodiment of the present invention; and FIG. 2 is a top plan view of the structure shown in FIG. 1 with a bale of hay shown in the machine.

Generally, the present invention comprises a bale cutter arrangement of a certain bale cutting chamber, a cooperating pair of cantilever cutter assemblies, and a deflector construction. The combination in operating avoids clogging of the machine in cutting rectangularly shaped bales of hay or straw material in which most of the stalks of the material in the bale are arranged in parallel alignment and the bale is delivered to the cutting chamber to cut the material perpendicular to the length of the stalks.

There are a number of important advantages in a bale cutter machine assembled as shown in the drawing. Constructing the bale cutting chamber as a simple flat-walled rectangular chamber open at the top and bottom provides an economical assembly. A simple and efficient arrangement is further insured by mounting a pair of cutting assemblies as a cantilever from one sidewall to extend across the chamber toward the opposite sidewall. With this arrangement the power assembly and drive is conveniently concentrated on one side of the machine and there is no need for drive supporting structure on any of the other sides of the machine. To avoid clogging in such a machine construction when parallely arranged hay or straw stalks in a bale are transversely cut I have found that a single deflector mounted on the sidewall and between the extending tip portions of the pair of cutting assemblies and further included upwardly and toward the top edge of that sidewall, produces a machine that is unexpectedly free of clogging. This result is important because it permits the cutter assemblies to be driven by a power source substantially smaller and with lower applied torque than would be required with other known constructions. The results achieved with the described combination are further important when the cutter assemblies comprise continuous cutter chains carried on guide bars with the upper flights of chains moving toward the unsupported ends of the cutter assemblies. Such cutter assemblies appear to cooperate with the other elements of the combination to produce a simple and efficient machine for cutting bales as described.

As shown in the drawing, the bale cutting chamber comprises a rectangular chamber defined by flat sidewalls 10, 11, 12 and 13. The top of the chamber is open to receive a bale of hay and the bottom is open to drop the cut hay therefrom. As shown in FIG. 2 a bale of hay 14 is deposited in the chamber with the longitudinal axes of the hay stalks parallel to the sides 11 and 13.

The pair of cutter assemblies 15 in the present embodiment each comprise a continuous cutting chain carried on a guide bar 17. The guide bars 17 are mounted on the opposite sides of a U-shaped support member 18. The support member 18 is mounted on the outward side of the wall 11 and carries the guide bars 17 in horizontal spaced-apart relationship through appropriate slots in the wall 11 to extend toward the wall 13. The means for mounting the guide bars 17 on the support member 18 are a plurality of fasteners 19 projecting through slots in the rearward end of the guide bars 17 and into the support member 18. The slots in the guide bars 17 are provided to permit the guide bars 17 to be adjusted along their longitudinal axes to thereby adjust the tension of the cutting chains 16. The rearward portion of each of the cutting chains 16 is drivingly engaged by a sprocket 20. Each sprocket 20 is keyed on a shaft 21 and secured between collars 22. The shaft 21 is rotatively carried by a pair of spaced-apart pillow blocks 23. The pillow blocks 23 are mounted on the support member 18.

One end of the shaft 21 is provided with a sheave assembly 24 keyed thereto. The sheave assembly 24 is driven from a sheave assembly 25 and a pair of V-belts 26. The sheave assembly 25 is keyed on the output shaft of a source of power 27. The power source 27 is mounted on a base member 28 which in turn is secured to the support member 18 and the bale cutting chamber. The power source 27 rotates the sheave assemblies 24 and 25 is a direction so that the upper flights of the cutting chains 16 move toward the wall 13 and the lower flights move toward the wall 11, as shown by the arrows in FIG. 1.

The invention further comprises a deflector 29. The deflector 29 is secured to the inward side of the wall 13 and has a bale directing surface which is inclined from the upper edge of the wall 13 downwardly and inwardly to a point below the upper flights of the cutting chains 16 and between the guide bars 17.

In a reduction to practice of the invention it has been found that a bale of hay deposited into the upper portion of the bale cutting chamber and on the cutter assemblies is quickly and efficiently cut into relatively small masses without clogging and consequent stalling of the drive. It is believed that the lack of any deflectors on the other sides of the cutter assemblies is important because it has appeared that when a bale is dropped into the chamber, aligned as shown in FIG. 2, the hay stalks, before being cut and extending transversely across the cutter assemblies, could wedge into the cutting chains 16 if supported by deflectors on both sides of a cutter assembly and thereby overload the cutter assemblies.

Having described the invention what is considered new and desired to be protected by Letters Patent is:

1. In a machine for cutting rectangularly shaped bales of hay in which the stalks are arranged substantially parallel, the improvement of a cutting chamber having rectangularly arranged flat sidewalls and open top and bottom sides for receiving a bale of hay into said top side and discharging the cut bale of hay from said bottom side, a pair of horizontally spaced-apart cutter assemblies, support means carrying said cutter assemblies through one of said sidewalls and extending in a cantilever arrangement toward and spaced from the opposite sidewall of said cutting chamber, and a deflector mounted on said opposite sidewall to extend from the upper edge portion thereof in a direction inclined downwardly and toward said one sidewall and between said cutter assemblies, whereby a bale of hay deposited into said top side of said machine with the stalks of hay disposed perpendicular to the longitudinal axes of said cutter assemblies is cut into hay fragments avoiding clogging of the extending ends of said cutter assemblies.

2. In a machine as defined in claim 1, wherein each of said cutter assemblies comprises a continuous cutting chain carried on a guide bar, said guide bars positioned in vertical planes and carried on said support means, and power means for driving said cutting chains about said guide bars so that the upper flights of said cutting chains move toward said opposite sidewall and the lower flights of said cutting chains move toward said one sidewall.

3. In a machine as defined in claim 2, wherein the lower end of said deflector terminates above the lower flights of said cutting chains.

4. In a machine as defined in claim 3, wherein the portions of said opposite sidewall between said cutter assemblies and the other two walls of said cutting chamber are unobstructed so that said deflector provides the sole means for deflecting a bale of hay in said cutting chamber above said cutter assemblies away from said opposite wall.

\* \* \* \* \*